Figure 4:
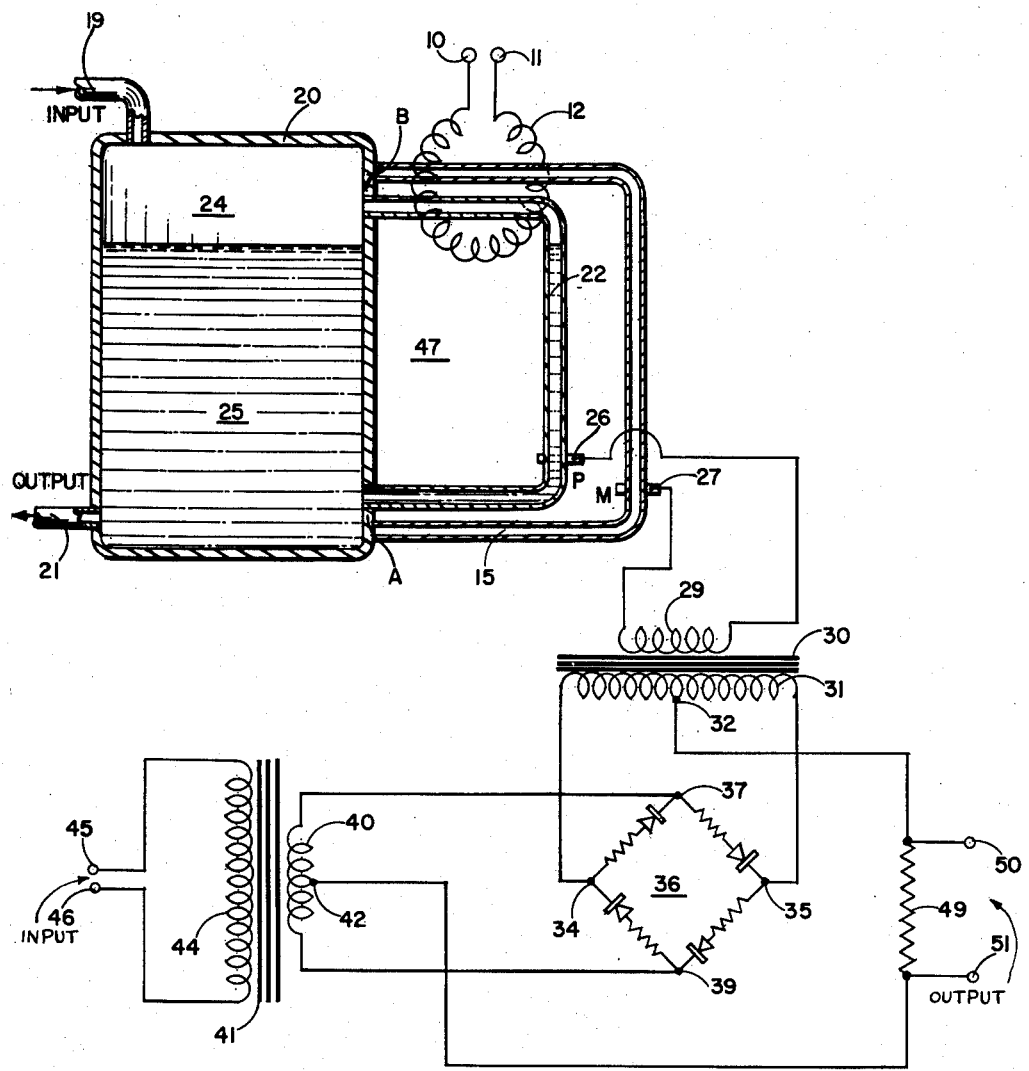

June 18, 1963 J. HYMAN, JR 3,094,106
LIQUID METAL LEVEL GAUGE
Filed April 12, 1960 2 Sheets-Sheet 1
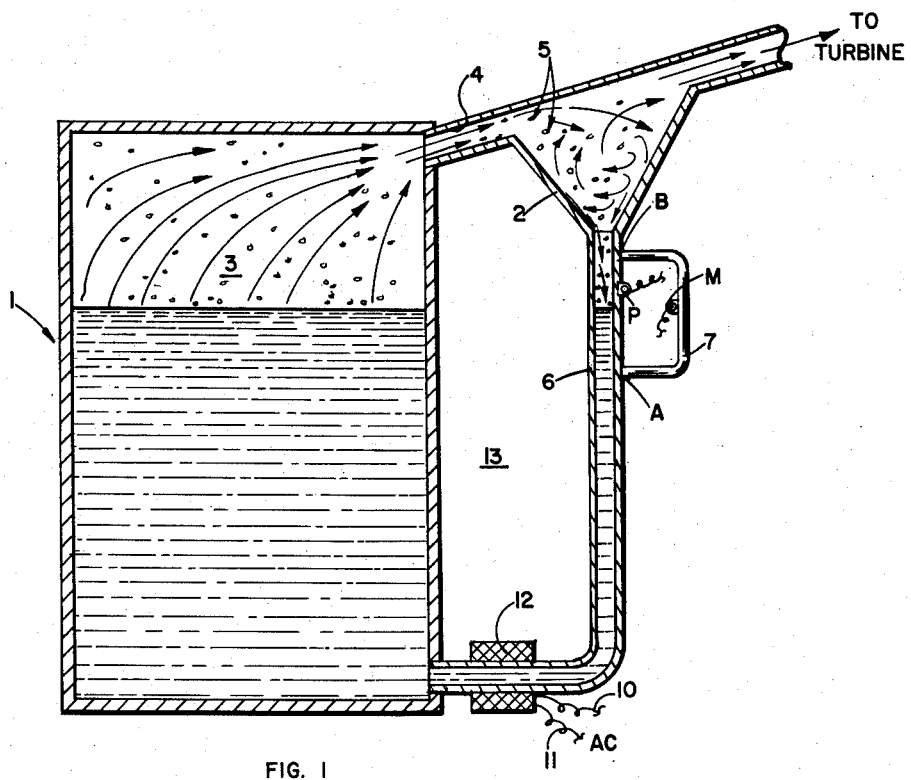
FIG. 1
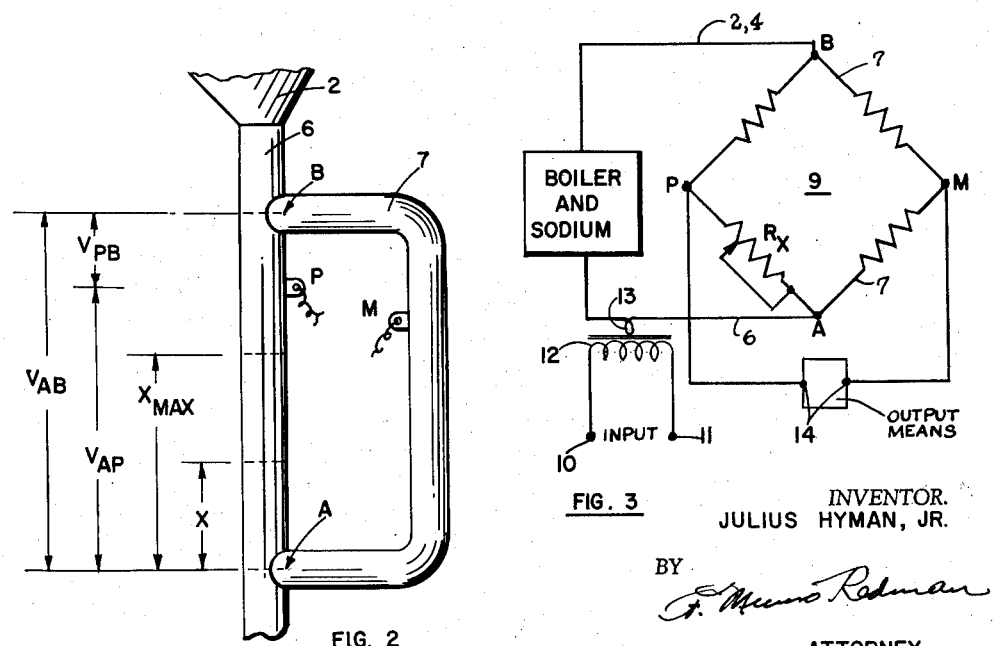
FIG. 2
FIG. 3
INVENTOR.
JULIUS HYMAN, JR.
BY
ATTORNEY June 18, 1963  J. HYMAN, JR  3,094,106
LIQUID METAL LEVEL GAUGE
Filed April 12, 1960  2 Sheets-Sheet 2

INVENTOR.
JULIUS HYMAN, JR.
BY
ATTORNEY

United States Patent Office 3,094,106
Patented June 18, 1963

3,094,106
LIQUID METAL LEVEL GAUGE
Julius Hyman, Jr., Los Angeles, Calif., assignor to North American Aviation, Inc.
Filed Apr. 12, 1960, Ser. No. 21,824
7 Claims. (Cl. 122—451)

The invention relates to the measurement of the quantity or height of a liquid within an enclosed container, and is particularly suitable for the measurement of conducting materials, such as the liquid metals, sodium or cesium, which may be at elevated temperatures and pressures.

The measurement of the height, volume, or quantity of a liquid within an enclosed system presents substantial problems where conditions of temperature or pressure therein make it difficult or impossible to use conventional probes or similar measuring devices.

Such a condition exists in the case of liquid sodium or cesium and the like, where the nature of the substances makes it undesirable to open the case or vessel to the air for the insertion of measuring equipment, and yet it is necessary to know at any instant the height or quantity of the liquid.

The measuring device or system of the invention has particular application to a sodium boiler and turbine combination, in which the sodium level must be maintained within close tolerances. If the liquid level drops below the top of the heater tubes in the sodium boiler, which are heated to very high temperatures under normal conditions, they would quickly burn. If the level rises too high, liquid sodium might be thrown on the turbine blades, causing extensive damage. Hence, a sodium level control system is necessary, which essentially requires a transducer to convert the height of the liquid to a usable control signal. The signal obtained from the transducer may be introduced into a conversion network, including, for example, a ring demodulator, which operates an appropriate control system, such as a servo loop connected to a supply of the liquid metal and having suitable inlet and outlet valves, for maintaining the desired level.

This invention operates in a preferred embodiment by comparing the resistance of a portion of an electrical loop including the boiler and a liquid level indicating tube in which the liquid metal, under the influence of gravity, seeks the same level as the liquid in the sodium boiler, with that of a reference member of known resistance value.

The liquid metal affords a low resistance shunt across that portion of the tube in which it is held, reducing its over-all resistance. This comparison of resistances is used in a Wheatstone bridge to produce a control signal to maintain the level at the desired value.

In another preferred embodiment, the invention is utilized to control the level of liquid metal in a storage tank from which varying quantities are being delivered to a transfer tank.

The objects of this invention thus include:
Providing a measuring device for an enclosed system;
Providing means for measuring the height of a conducting liquid under abnormal pressure or temperature in an enclosed system, to facilitate controlling the quantity of liquid by means operating externally of the enclosed system;
Providing means for measuring the quantity of a conducting substance in an enclosed system under abnormal conditions of temperature or pressure such that the substance cannot be seen or otherwise engaged;
Providing means for determining the height of a liquid in an enclosed system with sufficient accuracy so that it may be servo-controlled within predetermined limits;
Providing more efficient means for controlling the handling and processing of materials which must be treated at high pressures and temperatures;
Providing means for measuring the quantity of an enclosed substance, the noxious nature of fumes from which makes it necessary to prevent exposing the material to the operator and the surrounding air; and
Providing improved means for processing substances which, because of their nature, must be handled within enclosed vessels.

These and other objects of this invention will become apparent from the following specification when taken with the accompanying drawings in which:
FIG. 1 is a side sectional view of the invention as incorporated in a sodium boiler connected to feed a turbine through a cyclone-type gas separator;
FIG. 2 is a fragmentary view of a portion of the electrical loop in the embodiment of FIG. 1;
FIG. 3 is a schematic diagram of the electrical circuitry used in the embodiment of FIGS. 1 and 2; and
FIG. 4 is an alternative embodiment of the invention including the electrical circuitry.

The invention has been particularly described as it is embodied in a system for maintaining the level of a liquid material, such as sodium or cesium, at a desired height in the boiler of a power loop. The evaporated sodium or cesium vapor is used to drive a turbine under high pressures and at high temperatures. Another preferred embodiment has been described which is used for controlling the liquid level in a vessel from which the liquid metal is being transferred to another vessel, as for storage or processing.

The temperature level in the boiler of the preferred embodiment illustrated in FIG. 1, ranges from 1200° F. to 1800° F., and the pressures range from 0 to 38 p.s.i.a. These values are outside the working range of equipment for this type of measurement presently available commercially.

In a typical sodium power loop to which this invention has been applied, the sodium vapor is forced out of the conventionally heated boiler 1, passing into the vapor portion 3 of the boiler chamber. From the vapor portion 3, the vapor is delivered through turbine supply tube 4 to the nozzles of the turbine, not shown. Before entering the turbine, vapor is forced through a gas separator 2 which may conveniently be of the centrifugal or cyclone-type. The separator 2 removes any particles of liquid sodium which have not been completely evaporated, as indicated generally at 5, and returns them to the boiler. Such removal prevents damage to the turbine impeller blades, which might otherwise occur on contact with the liquid.

The separated liquid is returned to the boiler by means of the liquid level indicating tube 6, which also functions as a drain tube. The liquid seeks the same level in the liquid level indicating tube as that in the boiler, by gravity.

The height of the liquid in the boiler 1 is then determined by measuring the resistance of a section including the partially filled liquid level indicating tube 6 and comparing it with that of a reference member 7. Member 7 may be a sealed tube or a rod in which there is no shunting effect due to contained liquid, and may preferably be of the same material as tube 6. It is divided into two sections by a connection intermediate its ends, as will be described below. These two sections then act as serially connected bridge arms. The over-all resistance of the liquid level indicating tube 6 is reduced by the parallel path offered by the liquid metal filling it, and will hence vary with the instantaneous height of the metal in the tube and boiler, up to a desired maximum, $X_{Max}$, as indicated in FIG. 2.

The resistance comparison may be carried out in an alternating-current Wheatstone bridge circuit, shown schematically in FIG. 3 at 9. Obviously, any equivalent circuit for comparing or measuring resistance might be used. A conventional power supply, not shown, may deliver current, at any convenient frequency, such as 60 c.p.s., through leads 10 and 11 to a primary winding 12. Winding 12 is placed around the liquid level indicating tube 6 in the embodiment of FIGS. 1–3. Through the inductive coupling thus afforded, an alternating-current may be caused to flow around the single turn secondary winding indicated schematically at 13 in FIG. 3. This winding 13 comprises, as seen in FIG. 1, the drain tube 6 and the boiler 1, a portion of the turbine supply tube 4, the cyclone separator 2, and the reference member 7, which is disposed in bridge 9 in parallel with a portion of liquid level indicating tube 6. The induced current flows in the single turn secondary with a voltage transfer ratio of one divided by the number of turns in the primary winding 12.

The primary 12 may be a single layer multi-turn winding on a toroidal ferromagnetic core, and provides a highly reactive input to the single turn secondary 13. Due to the relatively low resistance of the tank 1, almost all of the resulting voltage is developed across the tube 6 and the reference member 7 associated therewith, which facilitates their use as part of a Wheatstone bridge.

In FIG. 2, point A represents the lower junction of the liquid level indicating tube 6 and reference member 7, while point B represents the uppermost junction between these elements. Points A and B then form a first set of oppositely disposed junction points in the bridge circuit 9 of FIG. 3. Points P and M form the second set of bridge junction points, quadrantally disposed to the first set of junction points A and B. Point P is a signal electrode connected on the liquid level indicating tube 6, and point M is a reference electrode positioned on the reference member 7. The reference member 7 is thus divided by electrode M into two passive or comparison arms, BM and MA, in the bridge circuit 9. Any output due to potential differences between points P and M is applied through output terminals 14 to an output means including suitable level correcting equipment or to quantity indicating means.

In a particular embodiment, the greatest excursion which is allowed for the liquid sodium in the boiler is three inches. The length of the reference member 7 from A around to B was arbitrarily selected as 10 inches. Point P, the signal electrode on the liquid level indicating tube, is located an inch above the highest level expected, and an inch below point B at the upper end of the measuring system.

The location of the measuring electrode M on reference arm 7 will next be considered. The reference arm 7 may be conveniently divided by the measuring electrode M to form the passive legs BM and AM of the bridge circuit, and returned to the liquid level indicating tube three inches below the desired high level position, $X_{Max}$.

The division of the voltage $V_{AB}$ into $V_{AP}$ and $V_{PB}$ is a function of the height to which section AP is filled with liquid sodium. The value of this ratio at the desired sodium level control point determines the position of the measuring electrode at point M on the reference arm, which is selected to give a null signal when compared to the voltage at point P. That is, by measuring the change in resistance to electrical current flow along the liquid level indicating tube, due to the parallel conduction path offered to current through the liquid sodium therein, the sodium level in the boiler can be determined, in accordance with equations set forth hereafter.

The arrangement described above permits introducing current for measurement into the liquid level indicating tube 6 and reference member 7 without either electrically insulating the liquid level indicating tube loop from the rest of the system or being adversely affected by the extremely low electrical resistance of the boiler in which the main sodium supply is contained. Using the same material at the same temperature in the comparison arms BM and MA of the bridge provides partial temperature compensation of the output and minimizes the importance of the driving voltage for obtaining a null signal.

In this embodiment the material known as "Haynes Stellite 25" was used for the arms which was identical with the material from which the boiler was made. "Haynes Stellite 25" is a heat-resistant alloy manufactured by the Haynes Stellite Co., Kokomo, Indiana, a division of Union Carbide Corp. It consists of 10% Ni, 49.5% Co, 20% Cr, 15% of W, 3% Fe, 0.1% C, 1% Si, and 1.4% Mn.

An alternative embodiment is illustrated in FIG. 4. Here the invention is applied to the control of the level of the liquid metal, or of any conducting liquid, which is to be fed through an input line 19 into a transfer tank 20 and then delivered to other equipment through an output line 21.

Here a liquid level indicating tube 22 extending between the upper, or vapor-receiving, portion 24 and the lower portion 25 of the tank may be employed. The liquid levels in the tank 20 and the liquid level indicating tube 22 will be identical. An electrode 26 corresponding to P in FIG. 1, and a measuring electrode 27 similarly corresponding to M are disposed on the liquid level indicating tube 22 and a reference member 15. Any potential difference between electrodes 26 and 27 is applied across the primary 29 of a transformer 30 having a secondary 31 center-tapped at 32.

The output of both halves of the secondary winding 31 is applied across a first set of opposite connection points 34 and 35 of a ring demodulator bridge circuit 36. The quadrantally opposite connection points 37 and 39 of bridge 36 receive an alternating-current input from the secondary 40 of an input transformer 41, center-tapped at 42. The primary 44 of transformer 41 may be energized through input leads 45 and 46 from the same alternating-current source as that which induces current in the single turn secondary loop 47 by means of winding 12 and leads 10 and 11.

By biasing the ring demodulator circuit 36 with the same alternating-current supply as that which is applied to it from the single turn secondary loop 47 through the primary input winding 12, a direct-current output signal is obtained across the transformer secondary center-tap leads 32 and 42. This output signal may be applied across output impedance 49 to output terminals 50 and 51, and connected to suitable means for correcting and indicating the level. These means are conventional and are not shown in the figure. This signal is an analog representation of the height of the liquid in the liquid level indicating tube. This is fundamentally the same system as used in the embodiment of FIGS. 1–3, as will be readily apparent. The equations 1 and 2 presented below may be readily applied to this embodiment.

In the embodiment of FIG. 4, the reference member portion of the single turn secondary has a greater length in proportion to the liquid level indicating tube than in FIG. 2, but the principles involved remain the same. The reference member 15 merely extends the length of the bridge arms BM and MA, but their proportionality to the bridge arms AP and BP remains unchanged.

Obviously, any equivalent circuit for comparing the resistance of the bridge arms might be used. The ring demodulator circuit shown is adapted to provide a direct-current output at terminals 50 and 51, where the associated equipment is operable on a direct-current input.

In the embodiment illustrated in FIG. 4, the tank, the liquid level indicating tube and the reference member are made of stainless steel, using in a particular case an alloy known as SAE No. 321 Stainless. This is a heat-resistant alloy manufactured by the Alleghany-Ludlum Steel Corp., of Pittsburgh, Pennsylvania. It is made up of 18% Cr, 8% Ni, 0.1% C, 0.4% Ti, and 63.5% Fe.

Referring back to FIGS. 2 and 3, the arrangement shown is effective to define three inactive legs, PB, MB, and AM, and the single active leg AP in bridge 9. In the leg AP the instantaneous level X will be allowed to vary between the lower point A and some point $X_{Max}$ below point P. The resulting resistance changes are represented in the circuit of FIG. 3 by the variable resistance $R_X$. As the instantaneous level X rises above point A, section AP becomes shunted by the liquid sodium, causing the voltage $V_{AP}$ to decrease relative to the total voltage across the bridge 9, or $V_{AB}$. This may be expressed by the equation:

$$\frac{V_{AP}}{V_{AB}} = \frac{(AP-X)(R_{HS}) + R_{11}X}{(AB-X)(R_{HS}) + R_{11}X} \quad (1)$$

In this expression $R_{HS}$ is the resistance per unit length of the tubing used in this embodiment, and $R_{11}$ is the resistance per unit length of this tubing in parallel with a column of sodium of height X and resistance $R_{Na}$ shunting it. Both resistances are properties of the particular materials and geometries involved.

Dividing the equation by $R_{11}$, the expression $$\frac{R_{HS}}{R_{11}}$$

appears. A function $$R(T) = \frac{R_{HS}}{R_{Na}}$$

may be introduced to simplify the equations. Equation 1 then becomes:

$$\frac{V_{AP}}{V_{AB}} = \frac{AP - X\left[\frac{R(T)}{R(T)+1}\right]}{AB - X\left[\frac{R(T)}{R(T)+1}\right]} \quad (2)$$

A signal null is desired when the liquid has risen to the center of the normal operating level at design temperature. Solving Equation 2 for this design center, point M on the reference arm is placed at this solution value so as to give a null output between point M and point P when this level condition is realized. If the level exceeds this value, there will be a 180° phase reversal in the signal taken from M to P. With a ring demodulator circuit, this change in phase is converted into a change of sign of a direct-current signal. In a typical application, it has been found that the null signal control point of 1.5 inches above the minimum level places $V_{AP}$ at design center so that 74 percent of the total voltage from A to B exists when the reference electrode is placed 7.4 inches up from A on the reference member, which has been selected as described above as 10 inches. It will be recognized that in general the exact location of the signal and reference electrodes may be varied, provided a suitable sign correction is made, from the positions as shown to complementary positions relative to the liquid and gas phases of the material being measured. The signal electrode, however, must always be in the same medium, whether liquid or vapor.

An additional source of error not discussed is due to the effect of overflowing sodium, which may run down the drain tube above the liquid level and lower the resistance of the Stellite tube. This results in a change of R(T), the same as if the temperature had changed. If we assume that a certain quantity of sodium Q of flowing uniformly down the wall of the tube with a parabolic velocity profile, the average velocity U may be shown to be $$U = \tfrac{1}{3} g \frac{D^2 \rho}{v} \quad (3)$$

where $g = 32.2$ feet per (second)$^2$
$v = 2.01 \times 10^{-6}$ lbs./sec. ft. (kinematic viscosity)
$D =$ the film thickness (ft.$^2$)
$\rho =$ density (lbs./ft.$^3$)

This results in a change in R(T) from 3.1 to 1.7, causing a null shift from ⅓ inch to 1.8 inches. This is not serious, however, and, as it is of an unpredictable nature, cannot be compensated in control applications.

In situations where accurate measurement of values is desired, the error could be avoided by using two tubes, one for actual drainage and the other as the liquid level gauge member, as will be obvious to those skilled in the art.

The invention as described above provides simple and accurate means for determining, indicating, or controlling the level of any conducting liquid in an enclosed vessel, and is especially useful in those cases where extremes of temperature and pressure are encountered and the operation must be carried on in an enclosed system.

Although the invention has been described and illustrated in detail, it is to be clearly understood that the same is by way of illustration and example only and is not to be taken by way of limitation, the spirit and scope of this invention being limited only by the terms of the appended claims.

I claim:

1. Means for determining the level of a conductive liquid comprising a container for said liquid; a closed electrical loop comprising said container and means for carrying liquid extending between the upper and lower portions of said container; said carrying means constructed and arranged to retain liquid therein at the same vertical level as that in said container; a reference member shunted across a portion of said liquid carrying means; means operatively connected to said reference member and said closed electrical loop for continuously comparing the resistance of said portion of said reference member with that of said closed electrical loop and said liquid therein; and means operatively connected to said last mentioned means for utilizing said comparison as a measure of the quantity of liquid in said container.

2. Means for determining the quantity of liquid metal contained in a closed loop system including a boiler, means operatively connected to said closed loop processing system for inducing a circulating electrical current therein, said system comprising means for measuring the electrical resistance of a section of said closed loop having a quantity of said metal therein proportional to the quantity of said metal in said boiler; a reference member operatively connected to and disposed in parallel with said section of said closed loop; means operatively connected to said reference member and said closed loop for continuously comparing the resistance of said reference member with that of said section of said closed loop; and means operatively connected to said last mentioned means for utilizing said comparison as a measure of the quantity of liquid within said system.

3. In combination with an enclosed system for processing liquid metal having a boiler, a quantity of such liquid metal therein, and a tube, forming a closed loop, means for determining externally the quantity of said liquid metal in said boiler, comprising a signal electrode disposed on said tube above the highest level of liquid metal anticipated therein; a reference member disposed in parallel with a portion of said tube and having an upper junction therewith above the highest level of liquid material anticipated therein and a lower junction therewith below the lower level anticipated therein; a reference electrode disposed on said reference member; means for inducing a circulating electrical current in said closed loop; means for utilizing said liquid level indicating tube and said reference member as arms of a Wheatstone bridge circuit, with said lowest junction between said tube and said reference member acting as a first set of opposite disposed bridge junction points, and with said electrode and said reference electrode acting as a second set of opposite bridge junction points therein; said bridge circuit being adapted to compare the resistance of the reference member with that of said tube portion as shunted by varying quantities of said liquid metal therein, and adapted to furnish potential indicative of any variation in liquid height to servo means for level indicating and restoring purposes.

4. Means for determining the quantity of a conducting fluid within an enclosed system, comprising a main housing for said fluid; a tube arranged on said main housing to receive a portion of said fluid and to have the same level as that in said main housing; a reference member in parallel with a portion of said tube, said reference member being connected terminally to said tube and divided electrically to constitute two passive arms of an electrical bridge; said tube being connected to constitute one passive and the active arm of said bridge circuit whereby the conducting fluid in contact with varying lengths of said tube may provide a varying resistance related to the height of said fluid therein; means operatively connected to said tube for inducing current flow therein; means operatively connected to said tube and said reference member for continuously comparing such varying resistance with the resistance of said reference member; and means operatively connected to said last mentioned means for utilizing said comparison to provide indications of the instantaneous height of said conducting fluid within said main housing.

5. Means for measuring the quantity of a liquid material within an enclosed system, comprising a boiler; a separator drain tube; a reference arm disposed in parallel with said tube; a supply of liquid enclosed in said boiler and adapted to be heated for conversion into gaseous form; a separator arranged to extract liquid from gas and liquid driven off from said boiler; said drain tube being arranged to return the liquid so extracted to said boiler and to have a liquid level height therein substantially the same as that in said boiler; means for inductively applying current to a loop comprising said boiler and said drain tube and said reference arm; means for measuring externally the potential drop along said drain tube between a predetermined reference point and the level of liquid therein; and means for comparing the potential drop between said predetermined reference point and the instantaneous level of said liquid in said tube with the potential drop between said reference point and the remainder of said reference arm.

6. In an enclosed system having a tank for the storage and delivery of liquid metal under high temperature and pressure, means for indicating the quantity of said liquid in said tank, comprising tube means for holding a portion of said liquid in a position displaced transversely from said tank to reproduce the liquid level therein, over an anticipated level range; means for utilizing said transversely displaced portion of tube means as part of a closed loop including said tank and the liquid metal therein; means for providing a fixed resistance reference member in parallel with said tube means; said reference member having an upper junction point with said tube above the anticipated high level point of said liquid metal, and having a lower junction point with said tube below the anticipated low level point thereof; connection electrodes oppositely disposed on said fixed resistance reference member and said tube adapted to act as a second pair of oppositely disposed Wheatstone bridge junction points; means adapted to receive power from an A.-C. source for inducing an alternating current flow in said closed loop; first transformer means having a primary winding connected to said second pair of connection electrodes, and having a center-tapped secondary; a ring demodulator circuit having a pair of connections from said secondary of said first transformer means to said input bridge connection point; a second transformer means having a primary adapted to receive power from an A.-C. source identical with that inducing current flow in said closed loop and having a center-tapped secondary; an output impedance; and output connections from the center-taps of said first and second transformer secondaries arranged to apply any potential differences therebetween across said output impedance.

7. In combination with a storage tank means for handling varying quantities of conducting liquid material which must be processed in an enclosed system, means for determining and controlling the level of said liquid material, comprising a tube joined to said tank and arranged to be filled by a portion of said conducting liquid tending to seek the same level therein as that in said tank; said tube being arranged to form a closed loop with said tank; means for inducing an alternating current in said closed loop; a reference member of fixed resistance disposed substantially parallel to said tube throughout the anticipated range of levels in said tank; upper and lower junction points between said tube and said reference member disposed respectively above the highest level and below the lowest level anticipated of said liquid in said tank; a signal electrode disposed on said tube between the highest and lowest liquid levels anticipated; a measuring electrode disposed on said reference member and positioned to have a null position relative to said signal electrode at a desired liquid level; a Wheatstone bridge circuit wherein said upper and lower junction points between said tube and reference member constitute a first set of opposite bridge junction points, and said signal electrode and said measuring electrode constitute a second set of opposite bridge junction points; first transformer means having a primary winding and a center-tapped secondary winding; means for connecting said signal electrode and said measuring electrode to said first transformer primary winding; second transformer means having a primary winding and a center-tapped secondary winding; said second transformer means and said means for inducing current in said closed loop being adapted to be energized from the same A.-C. power source; a ring demodulator circuit having a first pair of oppositely disposed junction points connected across said secondary winding of said first transformer means and a second pair of oppositely disposed junction points arranged quadrantally to said first pair of oppositely disposed junction points; output terminals; and means for connecting the center taps of said first and second transformer secondary windings across said output terminals to provide D.-C. signals representative of the level of said liquid, and to provide level-correcting signals.

References Cited in the file of this patent
UNITED STATES PATENTS

| 1,649,342 | Fenno | Nov. 15, 1927 |
| 1,768,553 | Freeman | July 1, 1930 |
| 2,213,485 | Conley | Sept. 3, 1940 |
| 2,411,248 | Cohen | Nov. 19, 1946 |
| 2,433,599 | Cohen | Dec. 30, 1947 |
| 2,541,576 | Detuno | Feb. 13, 1951 |
| 2,551,225 | Spierer | May 1, 1951 |
| 2,692,368 | Mohier | Oct. 19, 1954 |
| 2,749,754 | Linahan | June 12, 1956 |

FOREIGN PATENTS

| 562,394 | Germany | Oct. 25, 1932 |
| 871,390 | Norway | May 7, 1956 |

OTHER REFERENCES

Nuclear Process Instrumentation and Control Conference, May 20–22, 1958, Gatlinburg, Tennessee; reported in Oak Ridge National Laboratory Report 2695; pages 139–144.